United States Patent
Rico Alvarino et al.

(10) Patent No.: US 12,107,794 B2
(45) Date of Patent: *Oct. 1, 2024

(54) SMALL PACKET OPTIMIZATIONS FOR INTERNET-OF-THINGS APPLICATIONS

(71) Applicant: QUALCOMM Incorporated, San Diego, CA (US)

(72) Inventors: Alberto Rico Alvarino, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,439

(22) Filed: Sep. 5, 2023

(65) Prior Publication Data
US 2023/0412348 A1 Dec. 21, 2023

Related U.S. Application Data

(63) Continuation of application No. 16/930,059, filed on Jul. 15, 2020, now Pat. No. 11,750,350, which is a
(Continued)

(51) Int. Cl.
*H04W 74/00* (2009.01)
*H04L 5/00* (2006.01)
(Continued)

(52) U.S. Cl.
CPC ............ *H04L 5/0055* (2013.01); *H04L 67/12* (2013.01); *H04W 68/00* (2013.01); *H04W 68/02* (2013.01);
(Continued)

(58) Field of Classification Search
None
See application file for complete search history.

(56) References Cited

U.S. PATENT DOCUMENTS

| 9,491,614 B2 | 11/2016 | Barrett |
| 10,721,763 B2 | 7/2020 | Rico Alvarino et al. |
| | (Continued) | |

FOREIGN PATENT DOCUMENTS

| CN | 104380765 A | 2/2015 |
| CN | 105917692 A | 8/2016 |
| | (Continued) | |

OTHER PUBLICATIONS

Asustek: "Downlink Data Transmission and Reception in NR New State", 3GPP TSG-RAN WG2 Meeting#96, 3GPP Draft; R2-168090 Downlink Data Transmission and Reception in NR New State_V1.0, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 14, 2016-Nov. 18, 2016, Nov. 13, 2016 (Nov. 13, 2016), XP051177786, 5 Pages.
(Continued)

*Primary Examiner* — Lonnie V Sweet
(74) *Attorney, Agent, or Firm* — Patterson & Sheridan LLP

(57) ABSTRACT

Certain aspects of the present disclosure relate to methods and apparatus for optimizing delivery of a small amount of mobile originated (MO) or mobile terminated (MT) data.

16 Claims, 19 Drawing Sheets

Related U.S. Application Data continuation of application No. 15/874,787, filed on Jan. 18, 2018, now Pat. No. 10,721,763.

(60) Provisional application No. 62/448,922, filed on Jan. 20, 2017.

(51) Int. Cl.

| | |
|---|---|
| *H04L 67/12* | (2022.01) |
| *H04W 68/00* | (2009.01) |
| *H04W 68/02* | (2009.01) |
| *H04W 72/0446* | (2023.01) |
| *H04W 74/0833* | (2024.01) |
| *H04W 76/10* | (2018.01) |
| *H04W 76/27* | (2018.01) |
| H04L 1/00 | (2006.01) |
| H04L 27/26 | (2006.01) |

(52) U.S. Cl.
CPC ..... *H04W 72/0446* (2013.01); *H04W 74/004* (2013.01); *H04W 76/10* (2018.02); *H04L 1/00* (2013.01); *H04L 5/0048* (2013.01); *H04L 27/2602* (2013.01); *H04L 27/26025* (2021.01); *H04W 74/0833* (2013.01); *H04W 76/27* (2018.02)

(56) References Cited

U.S. PATENT DOCUMENTS

| | | | | |
|---|---|---|---|---|
| 11,750,350 | B2* | 9/2023 | Rico Alvarino | ...... H04L 5/0055 370/336 |
| 2004/0157626 | A1 | 8/2004 | Park et al. | |
| 2007/0254679 | A1 | 11/2007 | Montojo et al. | |
| 2012/0208545 | A1* | 8/2012 | Yang | ................... H04W 74/002 455/450 |
| 2012/0281566 | A1 | 11/2012 | Pelletier et al. | |
| 2012/0282956 | A1 | 11/2012 | Kim et al. | |
| 2013/0080597 | A1 | 3/2013 | Liao | |
| 2013/0201957 | A1 | 8/2013 | Van Phan et al. | |
| 2013/0301541 | A1 | 11/2013 | Mukherjee et al. | |
| 2013/0308564 | A1 | 11/2013 | Jain et al. | |
| 2014/0112308 | A1 | 4/2014 | Kwon et al. | |
| 2014/0126489 | A1 | 5/2014 | Zakrzewski | |
| 2014/0169319 | A1 | 6/2014 | Yang et al. | |
| 2014/0334380 | A1 | 11/2014 | Pinheiro et al. | |
| 2015/0113128 | A1 | 4/2015 | Huang et al. | |
| 2016/0081115 | A1 | 3/2016 | Pang et al. | |
| 2016/0135247 | A1 | 5/2016 | Ozturk et al. | |
| 2016/0165572 | A1* | 6/2016 | Chang | .................... H04L 12/66 455/458 |
| 2016/0192408 | A1 | 6/2016 | Martinez Tarradell et al. | |
| 2016/0212728 | A1 | 7/2016 | Chang et al. | |
| 2016/0295609 | A1 | 10/2016 | Vajapeyam et al. | |
| 2016/0353440 | A1 | 12/2016 | Lee et al. | |
| 2016/0374048 | A1 | 12/2016 | Griot et al. | |
| 2017/0078058 | A1 | 3/2017 | Marinier et al. | |
| 2017/0099682 | A1 | 4/2017 | Priyanto et al. | |
| 2018/0213556 | A1 | 7/2018 | Rico Alvarino et al. | |
| 2018/0270867 | A1 | 9/2018 | Yi et al. | |
| 2019/0014464 | A1* | 1/2019 | Kuge | ..................... H04W 76/11 |
| 2019/0028878 | A1* | 1/2019 | Kawasaki | ............. H04W 76/10 |
| 2019/0098667 | A1 | 3/2019 | Lai et al. | |
| 2020/0413438 | A1 | 12/2020 | Rico Alvarino et al. | |

FOREIGN PATENT DOCUMENTS

| | | |
|---|---|---|
| WO | 2013016862 A1 | 2/2013 |
| WO | 2016049125 A1 | 3/2016 |
| WO | 2017151437 A1 | 9/2017 |
| WO | 2017174447 A1 | 10/2017 |

OTHER PUBLICATIONS

CATT: "Further Considerations on a 2-Step RA Procedure," 3GPP Draft; R1-1700186, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), 4 pages, XP051207726, Retrieved from the Internet: URL: http://www.3gpp.org/ftp/Meetings_3GPP_SYNC/RAN1/Docs/ [retrieved on Jan. 16, 2017].

CATT: "Small Data Transmission in Inactive State", 3GPP TSG-RAN WG2 Meeting #95bis, 3GPP Draft; R2-166118, 3rd Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), XP051150736, 4 Pages.

ERICSSON: "Baseline Solution for Small Data Transmission in RRC_Inactive," 3GPP Draft, 3GPP TSG-RAN WG2 #96, R2-168713 Baseline Solution for Small Data TX in RRC_Inactive, 3rd Generation Partnership Project (3GPP), Mobile Competence Centre; 650, Route Des Lucioles; F-06921, Sophia-Antipolis Cedex; France, vol. RAN WG2, No. Reno, Nevada, USA; Nov. 14, 2016-Nov. 18, 2016, Nov. 13, 2016 (Nov. 13, 2016), 8 pages, XP051178263.

European Search Report—EP21192146—Search Authority—The Hague—Sep. 14, 2021.

HTC: "RRC Aspects in NB-IoT," Item IV: 3GPP Draft, 3GPP TSG-RAN2 Meeting #92, R2-156425 RRC Aspects in NB-IPT, 3rd Generation Partnership Project (3GPP), Mobile Competence Centre, 650, Route Des Lucioles, F-06921 Sophia-Antipolis Cedex, France, vol. RAN WG2, No. Anaheim, USA, Nov. 16, 2015-Nov. 20, 2015, Nov. 6, 2015 (Nov. 6, 2015), 20 pages, XP051024539.

Huawei, et al., "Benefit of UL Tracking", 3GPP TSG-RAN WG2 Meeting #95bis, 3GPP Draft; R2-166908, 3rd Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), XP051151342, Retrieved from the Internet: URL: http://www.3gpp.org/ftp/Meetings_3GPP_SYNC/RAN2/Docs/ [retrieved on Oct. 9, 2016], 7 Pages.

Huawei, et al., "Infrequent Small Data Transmission in NR," 3GPP Draft, 3GPP TSG-RAN WG2 Meeting #95bis, R2-166997, Infrequent Small Data Transmission in NR, 3rd Generation Partnership Project (3GPP), Mobile Competence Centre; 650, Route Des Lucioles; F-06921, Sophia-Antipolis Cedex; France, vol. RAN WG2, No. Kaohsiung; Oct. 10, 2016-Oct. 14, 2016, Oct. 9, 2016 (Oct. 9, 2016), 4 pages, XP051151406.

International Preliminary Report on Patentability—PCT/US2018/014372, The International Bureau of WIPO—Geneva, Switzerland, Aug. 1, 2019.

International Search Report and Written Opinion—PCT/US2018/014372—ISA/EPO—Jul. 17, 2018.

Nokia, et al., "Data Transmission in Inactive", 3GPP Draft, 3GPP TSG-RAN WG2 Meeting #96, R2-167706, Data Transmission in Inactive, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 14, 2016-Nov. 18, 2016, Nov. 13, 2016 (Nov. 13, 2016), 8 pages, XP051177524.

Nokia Networks: "Solution 4 Architecture Correction", 3GPP Draft; SA WG2 Meeting #111, S2-153323, 3rd Generation Partnership Project (3GPP), Mobile Competence Centre; 650, Route Des Lucioles; F-06921 Sophia-Antipolis Cedex; France, vol. SA WG2, No. Chengdu; Oct. 19, 2015-Oct. 23, 2015, Oct. 19, 2015 (Oct. 19, 2015), pp. 1-7, XP051013520, Retrieved from the Internet: URL: http://www.3gpp.org/ftp/Meetings_3GPP_SYNC/SA2/Docs/ [retrieved on Oct. 19, 2015].

Partial International Search Report—PCT/US2018/014372—ISA/EPO—Jun. 11, 2018.

Sony: "DL Data Transmission in RRC_Inactive", 3GPP TSG-RAN WG2 NR Ad Hoc, 3GPP Draft; R2-1700138 NR Inactive, 3rd

(56) References Cited

OTHER PUBLICATIONS

Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017, Jan. 17, 2017 (Jan. 17, 2017), XP051210723, 3 Pages.
Taiwan Search Report—TW107102028—TIPO—Nov. 4, 2020.
3GPP TR 23.720: "3rd Generation Partnership Project, Technical Specification Group Services and System Aspects, Study on architecture enhancements for Cellular Internet of Things (Release 13)", 3GPP Standard; 3GPP TR 23.720, 3GPP, Mobile Competence Centre, 650, Route Des Lucioles, F-06921 Sophia-antipolis Cedex, France, vol. SA WG2, No. V13.0.0, Mar. 15, 2016, XP051087943, 97 Pages.
Institute for Information Industry (III): "Random Access Procedure on Non-anchor PRB", 3GPP TSG-RAN WG2 Meeting#95, R2-165209, 3GPP, Mobile Competence Centre, 650, Route Des Lucioles, F-06921 Sophia-antipolis Cedex, France, vol. RAN WG2, No. Goteborg, Sweden, Aug. 22, 2016-Aug. 26, 2016, 3 Pages, XP051126807, Aug. 21, 2016.

\* cited by examiner

```
-- ASN1START

Paging-NB ::=                  SEQUENCE {
    pagingRecordList-r13           PagingRecordList-NB-r13    OPTIONAL,   -- Need ON
    systemInfoModification-r13     ENUMERATED {true}          OPTIONAL,   -- Need ON
    systemInfoModification-eDRX-r13 ENUMERATED {true}         OPTIONAL,   -- Need ON
    nonCriticalExtension           SEQUENCE {}                OPTIONAL
}

PagingRecordList-NB-r13 ::= SEQUENCE (SIZE (1..maxPageRec)) OF PagingRecord-NB-r13

PagingRecord-NB-r13 ::=        SEQUENCE {
    ue-Identity-r13                PagingUE-Identity,
    mtData-r15                     DedicatedInfoNAS           OPTIONAL,
    NPRACH-resource-r15            Integer(0...32)            OPTIONAL,
    ...
}

-- ASN1STOP
```

FIG. 12

```
-- ASN1START

Paging-NB ::=                          SEQUENCE {
    pagingRecordList-r13               PagingRecordList-NB-r13         OPTIONAL,   -- Need ON
    systemInfoModification-r13         ENUMERATED {true}               OPTIONAL,   -- Need ON
    systemInfoModification-eDRX-r13    ENUMERATED {true}               OPTIONAL,   -- Need ON
    nonCriticalExtension               SEQUENCE {}                     OPTIONAL
}

PagingRecordList-NB-r13 ::= SEQUENCE (SIZE (1..maxPageRec)) OF PagingRecord-NB-r13

PagingRecord-NB-r13 ::=    SEQUENCE {
    ue-Identity-r13        PagingUE-Identity,
    mtData-RNTI-r15        C-RNTI                OPTIONAL,
    NPRACH-resource-r15    Integer(0...32)       OPTIONAL,
    ...
}

-- ASN1STOP
```

FIG. 16

-- ASN1START

DirectDownlinkData-NB ::=            SEQUENCE {
    directDownlinkData-r15           DirectDownlinkData-r15         OPTIONAL,   -- Need ON
    systemInfoModification-r13       ENUMERATED {true}              OPTIONAL,   -- Need ON
    systemInfoModification-eDRX-r13  ENUMERATED {true}              OPTIONAL,   -- Need ON
    nonCriticalExtension             SEQUENCE {}                    OPTIONAL
}

DirectDownlinkData-r15 ::=           SEQUENCE {
    ue-Identity-r13                  PagingUE-Identity,
    mtData-RNTI-r15              C-RNTI                     OPTIONAL,
    NPRACH-resource-r15          Integer(0...32)            OPTIONAL,
    ...
}

-- ASN1STOP

FIG. 17

SMALL PACKET OPTIMIZATIONS FOR INTERNET-OF-THINGS APPLICATIONS

CLAIM OF PRIORITY UNDER 35 U.S.C. § 119

This application is a continuation of U.S. application Ser. No. 16/930,059, filed Jul. 15, 2020, which is a continuation of U.S. application Ser. No. 15/874,787, filed Jan. 18, 2018, which claims benefit of and priority to U.S. Provisional Patent Application Ser. No. 62/448,922, filed Jan. 20, 2017, assigned to the assignee hereof and hereby expressly incorporated by reference herein as if fully set forth below in their entireties and for all applicable purposes.

FIELD

The present disclosure relates generally to communication systems, and more particularly, to devices, systems, methods, and apparatus for optimizing delivery of relatively small amounts of data, such as commonly occurs in Internet-of-Things (IoT) applications. Embodiments can enable and provide power resource savings and enable improved connectivity features for device classes with lower mobility use cases (e.g., some IOT devices may have reduced mobility or may be stationary).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for optimizing delivery of relatively small amounts of data. Embodiments can include deployments where IoT applications/systems are based on devices with little to no mobility or capable of operating in scenarios with limited mobility. Such arrangements enable deployments and scenarios with reduced overhead as further discussed below.

Certain aspects of the present disclosure provide a method for wireless communication by a base station. The method generally includes receiving a paging indication and at least an indication of a limited amount of data targeted for a user equipment (UE) that is not in a connected state with the base station, transmitting a paging message to the UE with at least one of the data or an indication of the data, and monitoring for a physical random access channel (PRACH) transmission from the UE as an acknowledgment of receipt of the data Certain aspects of the present disclosure provide a method for wireless communication by a base station. The method generally includes receiving a paging indication and at least an indication of a limited amount of data targeted for a user equipment (UE) that is not in a connected state with the base station, transmitting a paging message to the UE with the indication of the data, and transmitting the data after the paging message Certain aspects of the present disclosure provide a method for wireless communication by a user equipment (UE). The method generally includes receiving from a base station, while not in a connected state, a paging message and at least an indication of a limited amount of data targeted for the UE, receiving the data in at least one of the paging message or a subsequent message, and transmitting a physical random access channel (PRACH) to the base station as an acknowledgment of receipt of the data Certain aspects of the present disclosure provide a method for wireless communication by a user equipment (UE). The method generally includes receiving from a base station, while not in a connected state, a paging message and at least an indication of a limited amount of data targeted for the UE and receiving the data in a subsequent message after the paging message Certain aspects of the present disclosure provide a method for wireless communication by a user equipment (UE). The method generally includes determining a set of resources for connectionless delivery of a limited amount of data to a base station, based at least in part on an amount of the data the UE has to send and transmitting to the base station, while not in a connected state, the limited amount of data using the determined set of resources Certain aspects of the present disclosure provide a method for wireless communication by a base station. The method generally includes determining a set of resources for connectionless delivery of a limited amount of data from a user equipment (UE), based at least in part on an amount of the data the UE has to send and receiving from the UE, while the UE is not in a connected state, the limited amount of data using the determined set of resources Aspects generally include methods, apparatus, systems, computer readable mediums, and processing systems, as substantially described herein with reference to and as illustrated by the accompanying drawings.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 12 illustrates example code for formation of a paging message, in accordance with certain aspects of the present disclosure.

FIGS. 16 and 17 illustrate example code for formation of a paging message and downlink data message, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
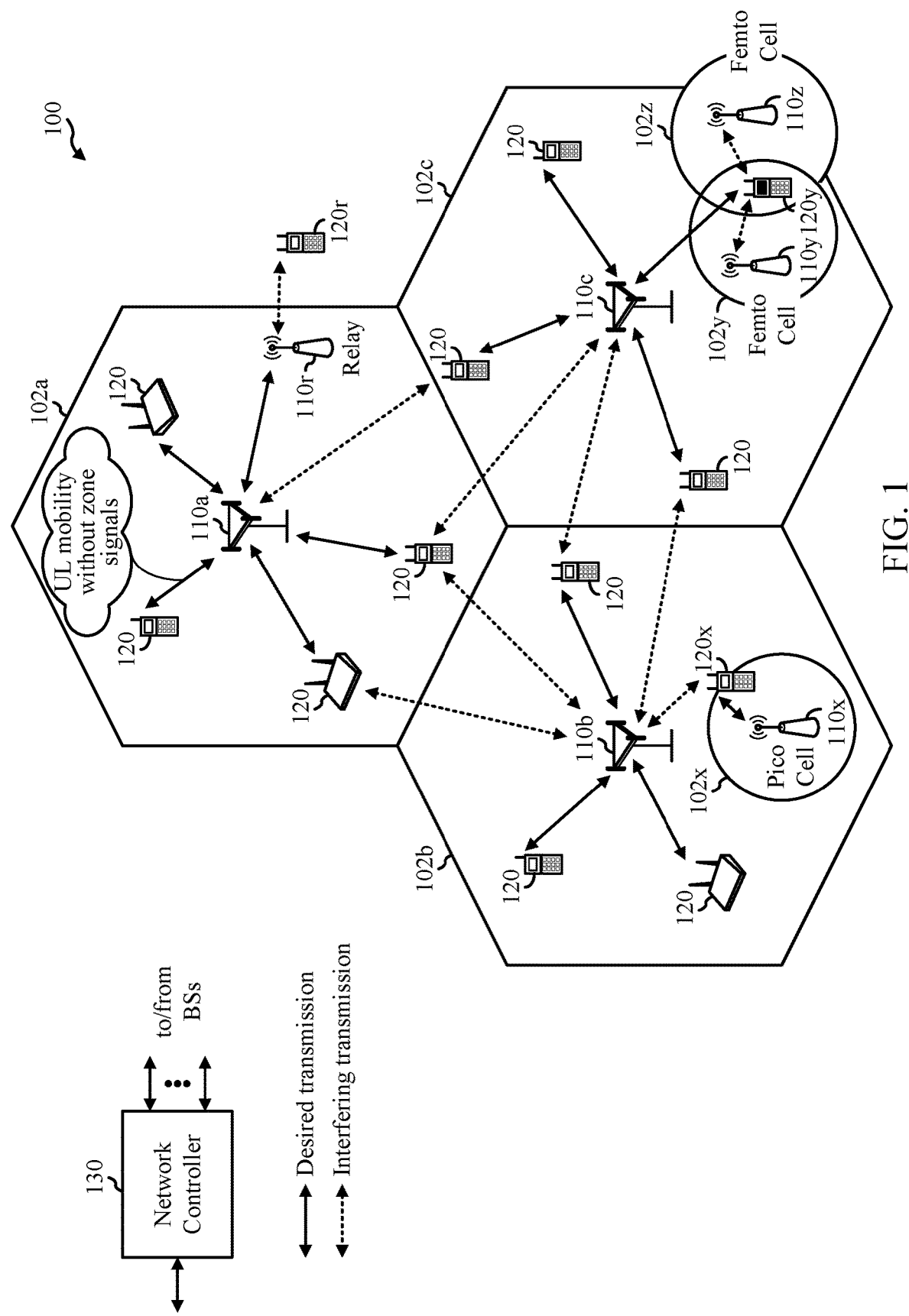
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to optimizing delivery of a relatively small amount of data, for example, by significantly reducing the amount of signaling overhead required for such delivery.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may communicate with a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
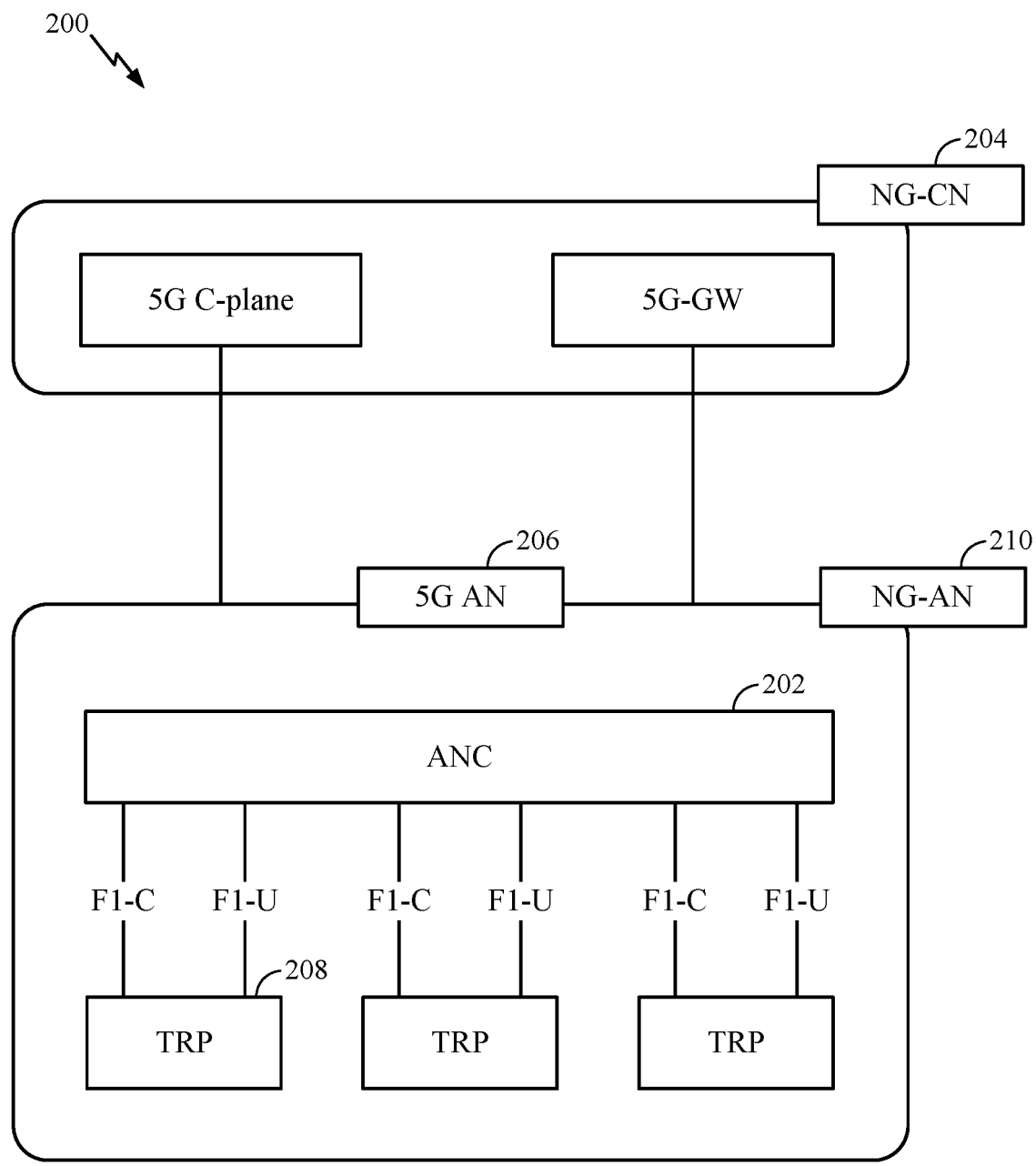
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NB s, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
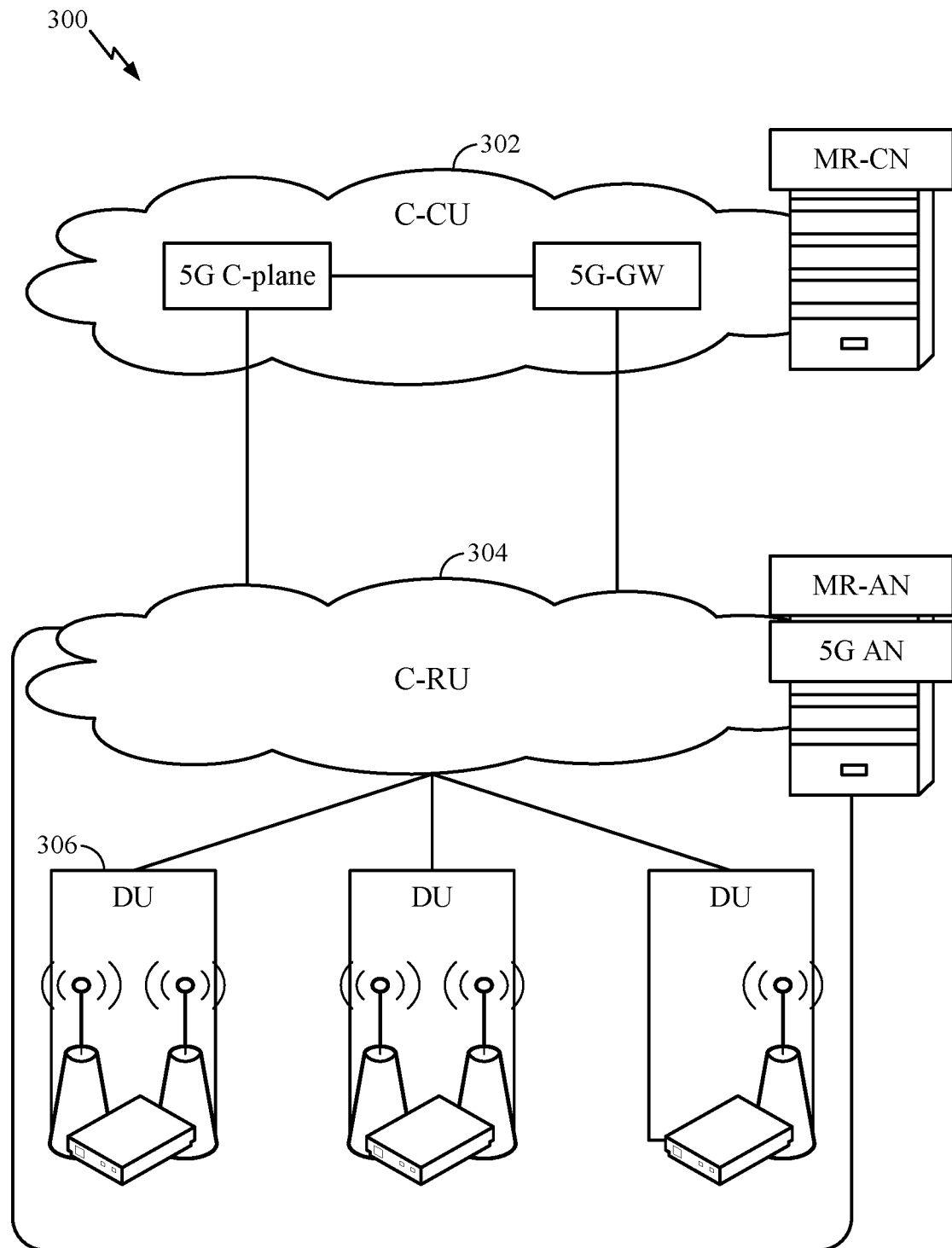
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
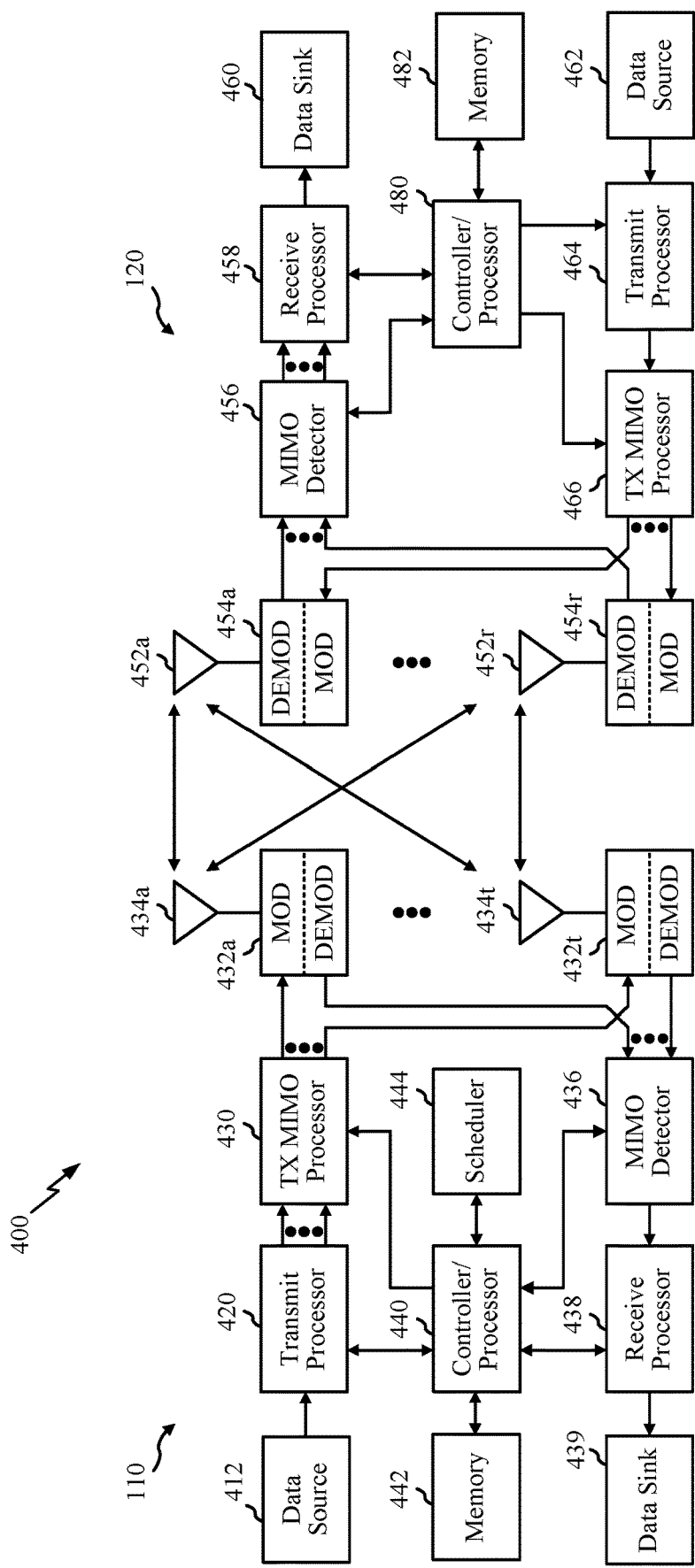
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to the figures.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in the figures, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
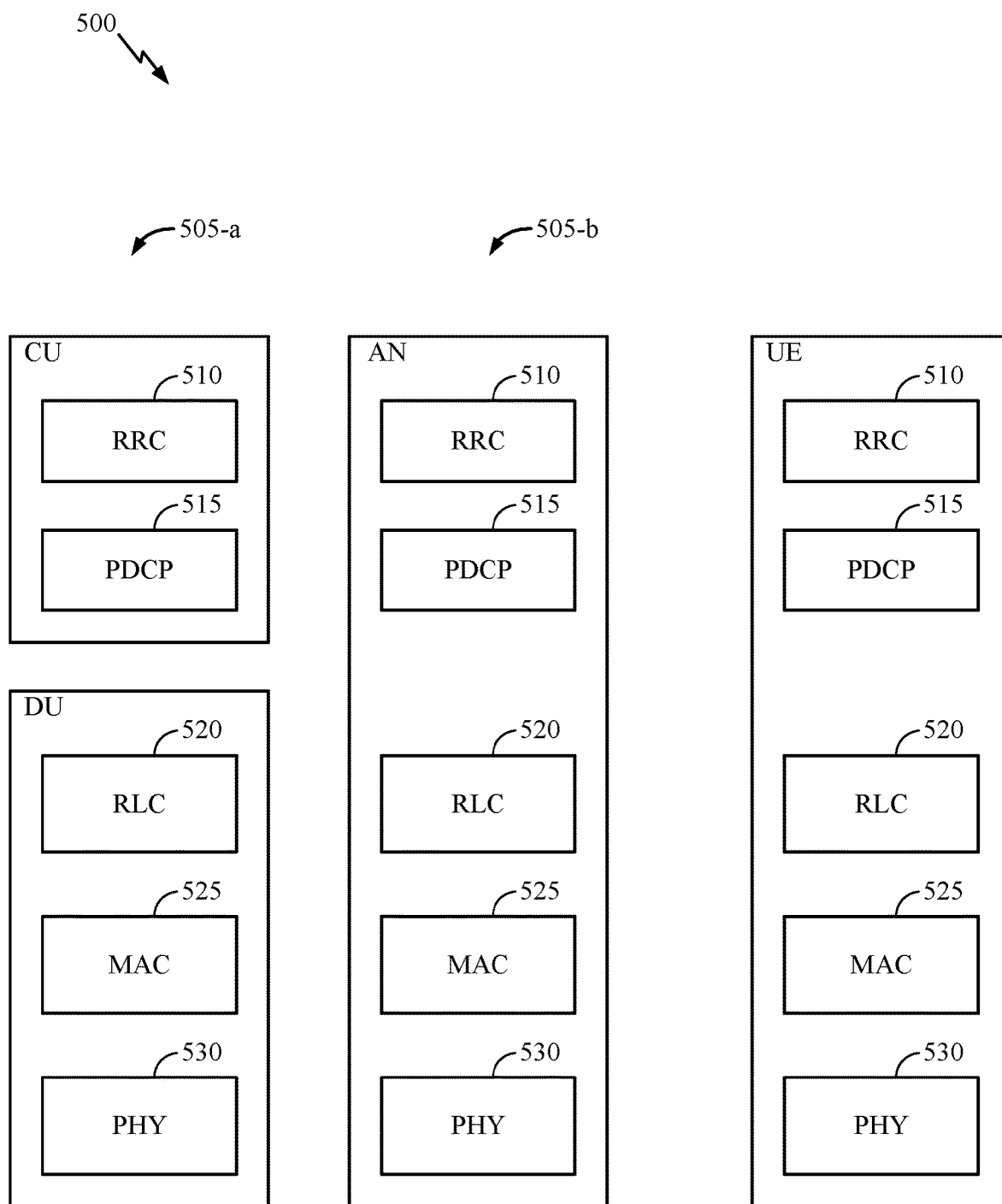
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
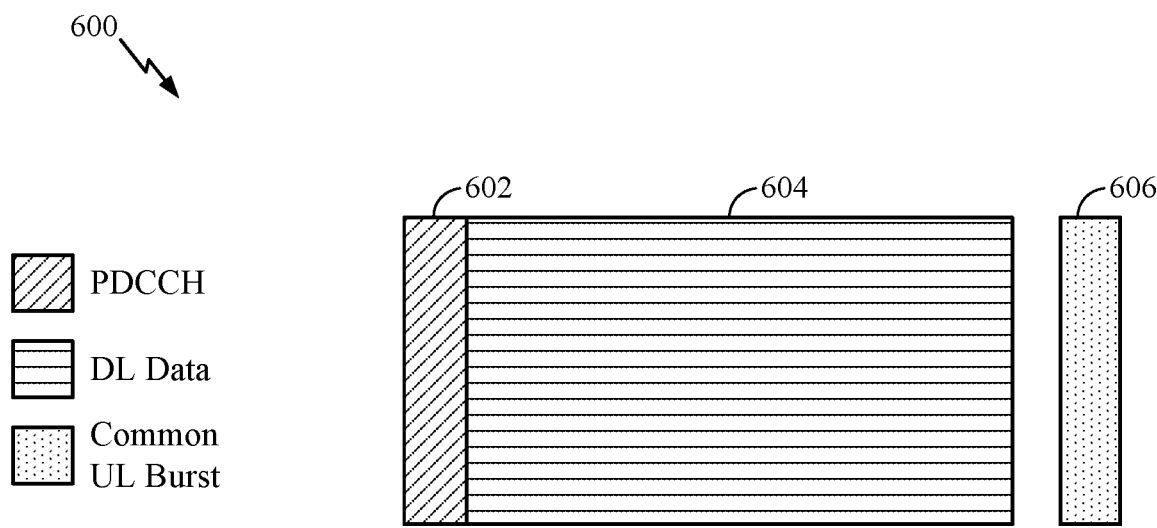
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
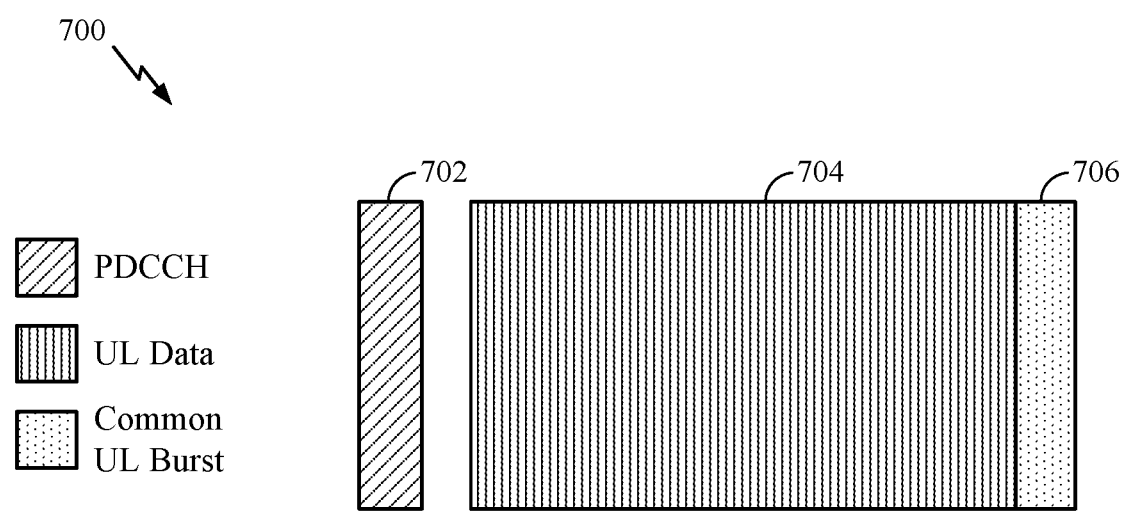
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Optimizations for Small Packet Delivery for Internet-of-Things Applications There are various IoT applications that involve an exchange of relatively small amounts of data. For example, metering and alarm applications typically involve a small amount of mobile originated (MO) data, while various queries, notifications of updates, actionable commands (e.g., enabling actuators), and the like involve a small amount of mobile terminated (MT) data.

Unfortunately, establishing a connection between a mobile device and network involves a large overhead (relative to the small amount of data). For example, for MT data, a device must first be paged and a total of 6 message are exchanged (Paging, msg1, msg2, msg3, msg4, and msg5). For MO data, the mobile must perform a RACH procedure so a total of 4 messages are exchanged (msg1, msg2, msg3, and msg4).

Aspects of the present disclosure may take advantage of the high probability that, in many applications that involve small packet delivery, the IoT devices involved may be relatively stationary (e.g., with little or no mobility). As a result, the network may know with high likelihood the cell in which the UE is camping.

Figure 8:
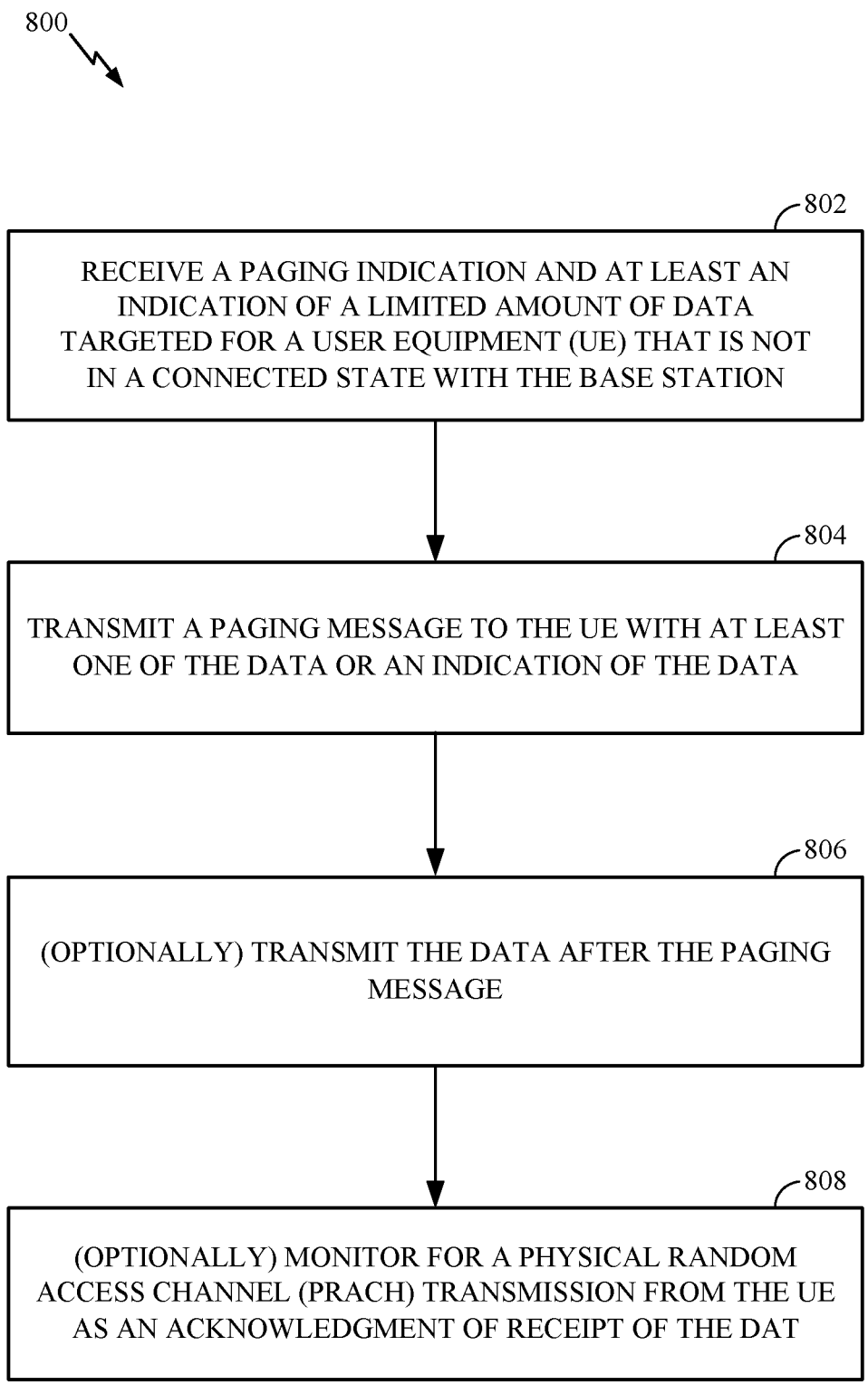
FIG. 8 illustrates example operations that may be performed by a base station to help optimize delivery of small amount of mobile terminated (MT) data, in accordance with certain aspects of the present disclosure.

Aspects of the present disclosure may help optimize small data delivery, in such cases, by encapsulating downlink data in a packet (e.g., a NAS PDU) and include it in the paging message or a message following the paging message. As will be described in greater detail below, an acknowledgement of the small amount of downlink (MT) data may be transmitted using PRACH over the radio interface FIG. 8 illustrates example operations 800 that may be performed by a base station to help optimize delivery of small amount of mobile terminated (MT) data, in accordance with certain aspects of the present disclosure.

Operations 800 begin, at 802, by receiving a paging indication and at least an indication of a limited amount of data targeted for a user equipment (UE) that is not in a connected state with the base station. At 804, the base station transmits a paging message to the UE with at least one of the data or an indication of the data.

Figure 9:
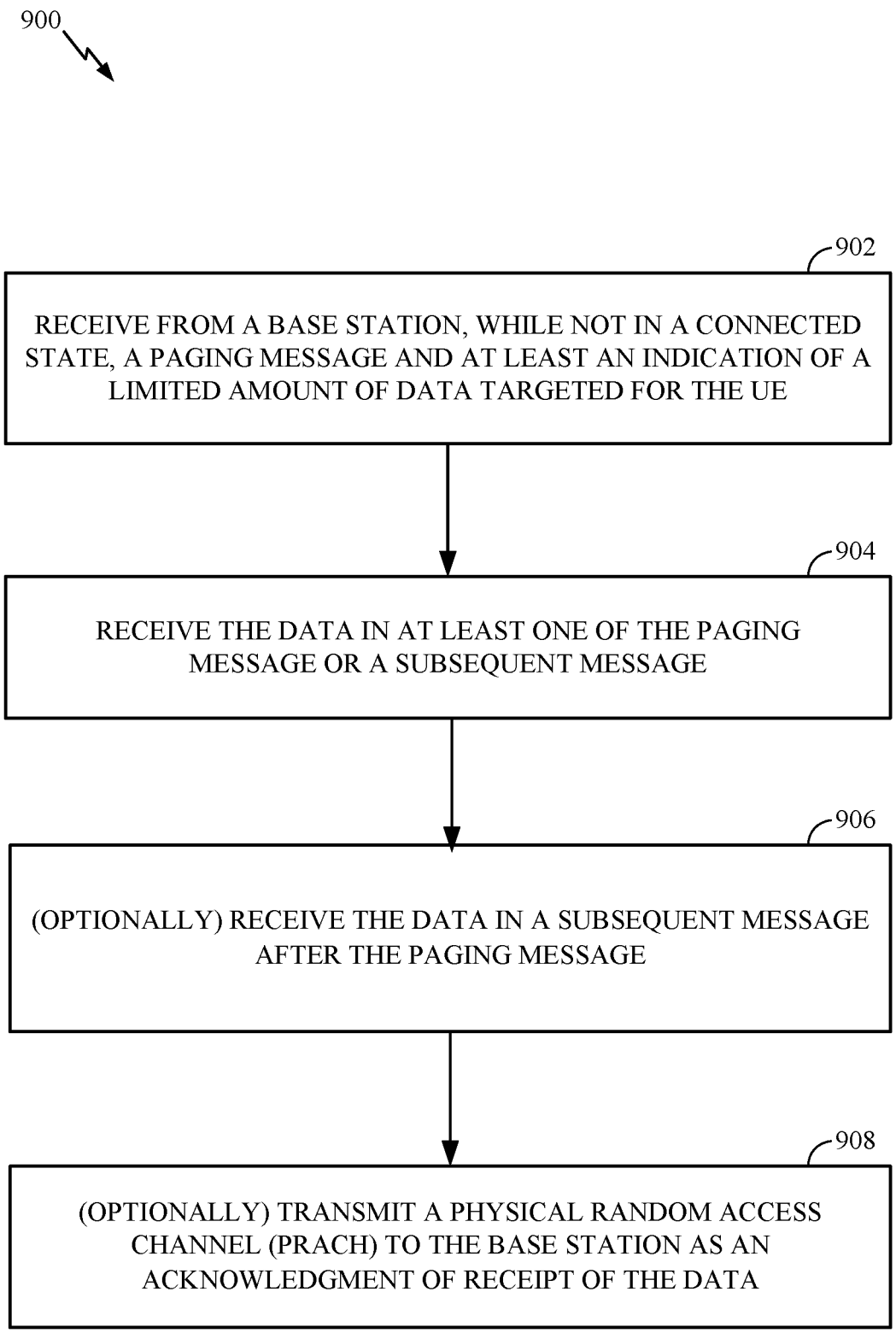
FIG. 9 illustrates example operations that may be performed by a user equipment to help optimize delivery of small amount of MT data, in accordance with certain aspects of the present disclosure.

In some cases, if the data is not included in the paging message, the data may be transmitted after the paging message, at 806. In some cases, at 808, the base station may monitor for a physical random access channel (PRACH) transmission from the UE as an acknowledgment of receipt of the data FIG. 9 illustrates example operations 900 that may be performed by a user equipment to help optimize delivery of small amount of MT data, in accordance with certain aspects of the present disclosure. Operations 900 may be considered complementary to operations 800, for example, performed by a UE to receive a small amount of data delivered in accordance with operations 800.

Operations 900 begin, at 902, by receiving from a base station, while not in a connected state, a paging message and at least an indication of a limited amount of data targeted for the UE. At 904, the UE receives the data in at least one of the paging message or a subsequent message.

Figure 10:
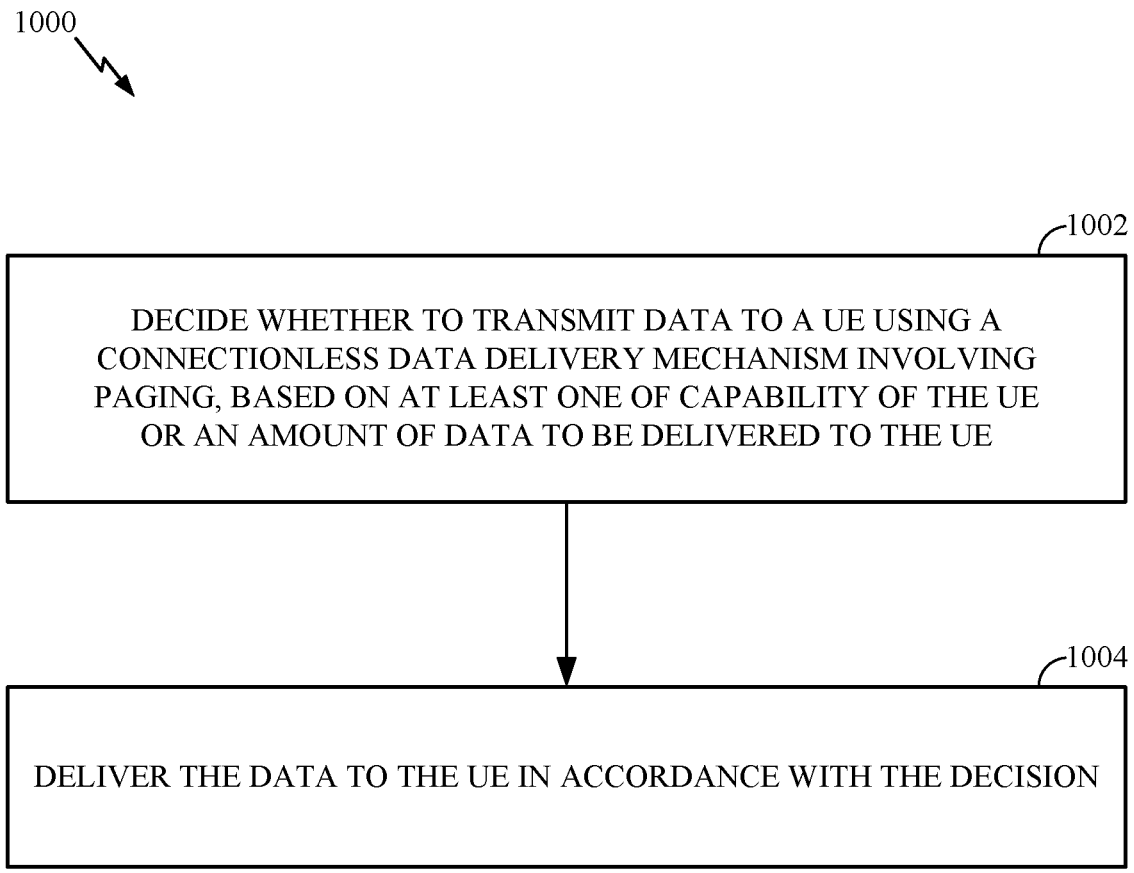
FIG. 10 illustrates example operations that may be performed by a network entity to help optimize delivery of small amount of MT data, in accordance with certain aspects of the present disclosure.

In some cases, if the data is not included in the paging message, the UE may receive the data after the paging message, at 906. In some cases, at 908, the UE may transmit a physical random access channel (PRACH) transmission as an acknowledgment of receipt of the data FIG. 10 illustrates example operations 1000 that may be performed by a network entity (e.g., an MME/S-GW) to help optimize delivery of small amount of MT data to a UE via a base station, in accordance with certain aspects of the present disclosure.

Operations 1000 begin, at 1002, by deciding whether to transmit data to a UE using a connectionless data delivery mechanism involving paging, based on at least one of capability of the UE or an amount of data to be delivered to the UE. At 1004, the network entity delivers the data to the UE in accordance with the decision.

Figure 11:
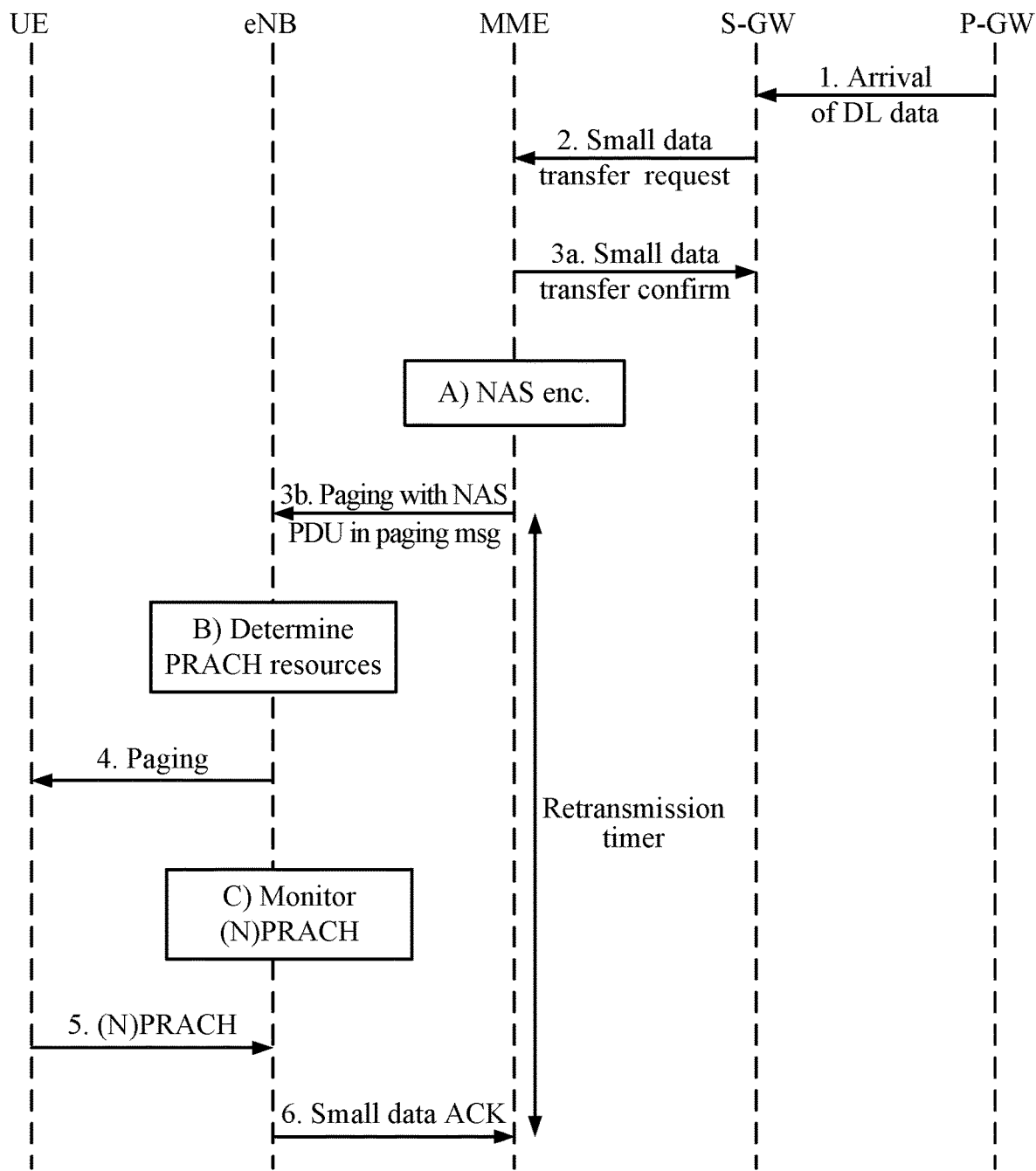
FIG. 11 is an example call flow diagram for delivering a small amount of MT data in a paging message, in accordance with certain aspects of the present disclosure.

FIG. 11 is an example call flow diagram for delivering a small amount of MT data in a paging message, in accordance with certain aspects of the present disclosure. For example, the eNB, UE, and MME (and/or S-GW) may perform operations described above with reference to FIGS. 8, 9, and 10, respectively.

As illustrated, at step (1), the S-GW receives DL data. The S-GW may first need to know that the UE (for which the DL data is directed) supports small data over paging. Both the UE, eNB and MME would need to support such deliver and the support (and monitoring) of this feature may be negotiated when the UE registers with the network.

Even if supported, the S-GW may need to determine whether to use connectionless small data delivery or establish a connection. In some cases, such determination may be based on an explicit configuration (e.g., having an API to let the application layer choose the type of message—connection or small data). As another option, a timer may be used, such that if no new messages are received within a time period, connectionless small data delivery is used (as the overhead of establishing a connection is not warranted). On the other hand, if more messages are received, the overhead may be warranted and a normal procedure may be used. In some cases, whether to use small data delivery or establish a connection may be decided based on the size of data.

In any cases, as illustrated at step (2), the S-GW may send a "small data transfer request" to the MME with the data to transmit. The MME may buffer this data. In case of MME overloading, the MME may reject the request, otherwise, the MME may confirm (accept) the request, at step (3a).

As illustrated, at step (3b), the MME may encapsulate the data in a NAS PDU and prepare a paging message with the NAS PDU and send the paging message to the eNB. In some cases, the MME may also include an indication of whether the message has to be acknowledged or not. The MME may also start a timer for retransmissions.

As illustrated at step (B), upon reception of the paging message, the eNB may prepare for the transmission and monitor for an ACK response. This process may be as follows: the eNB may determine an NPRACH resource for contention-free random access and include the corresponding resource index in the RRC paging message to the UE. The acknowledgement resource allocation may only be done if Acknowledgement is required from the eNB.

FIG. 12 illustrates example code for formation of a paging message, in accordance with certain aspects of the present disclosure. Of course, the variable names and values shown are for illustrative purposes only and actual names and values may vary.

Returning to FIG. 11, as illustrated at step (4), the UE may monitor for paging. This paging may be a regular type paging message or may be different. For example, a different P-RNTI may be used for the UE monitoring for small data enhancements. In such cases, the UE would need to monitor for two different P-RNTIs (one for normal paging message and one for modified paging message that contains NAS PDU).

At step (5), if the UE decodes paging (e.g., and it contains MT-data), then it does not go through the usual random access procedure/service request. Instead, the UE may i) deliver the PDU to NAS and ii) transmit an (N)PRACH in the indicated resources (to acknowledge receipt of the data). In such a case, the timing for this NPRACH transmission may be more relaxed, since RRC has to process the PDU and go back to the PHY. For example, the first resource after N+20 may be used for NPRACH transmission. In some cases (e.g., for extra security), the NPRACH resources can be transmitted inside the NAS PDU (and also scrambled with the scrambling sequence), such that an eavesdropper cannot "ACK" the reception by a different UE. For example, this resource may also include a scrambling sequence/cyclic shift.

At step (6), upon detection of (N)PRACH, the eNB sends an ACK to the MME. In response, the MME may flush the data and stops a counter. If the MME does not receive an ACK, it may try to retransmit the data. For example, the MME may try to deliver again with small data over paging in multiple eNB or the MME may try again using normal paging (e.g., and transmit data in msg6 as per legacy procedures).

In some cases, the use of small data delivery as described herein may warrant change in certain procedures, such as cell reselection, since the overhead due to "wrong eNB" when paging is high, since we are transmitting the data directly in the paging message. In other words, it may make sense to change the cell reselection algorithm to account for the mismatch. For example, if the UE has announced that it is able to receive NAS PDU over paging channel, it may change (or be configured to change) the cell reselection algorithm (e.g. give higher priority to the cell in which the UE received the PDU). This may be implemented, for example by adding an offset when ranking the cells to the cell in which the UE has received the last NAS PDU. In this manner, the UE may adjust cell reselection to remain on the cell where it received the NAS PDU. In some cases, there could be a timer associated with this (e.g., during X min, the UE keeps the threshold to bias towards last cell, after that it does normal cell reselection).

There may also be changes in the random access procedure (as an alternative to or in addition to changes in cell reselection). For example, the selection of power for NPRACH transmission may be different than that of regular random access. In some cases, the UE may simply transmit NPRACH without monitoring MSG2. Alternatively, the UE may monitor for MSG2, and continue the random access procedure until MSG2 is received which may be considered an ACK. In other words, MSG2 is typically a grant for MSG3 but, in this case, there is no MSG3 to transmit so MSG2 may be redefined to be an ACK and not contain any grant). In some cases, in an initial message exchange, the application layer can tell the UE that it is not a mobile UE, and the UE may send this "property" to the MME.

Figure 13:
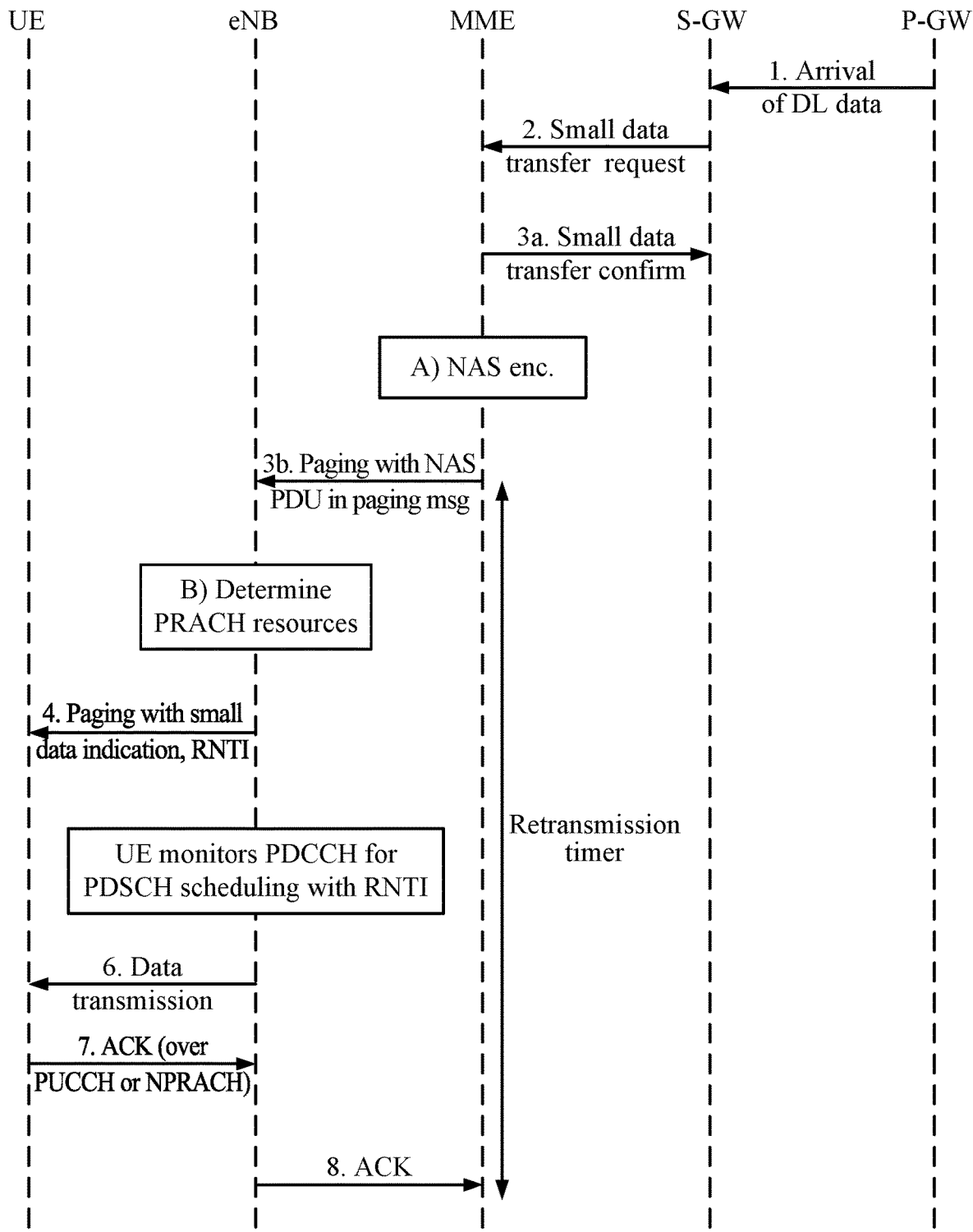
FIGS. 13-15 are example call flow diagrams for delivering a small amount of MT data following a paging message, in accordance with certain aspects of the present disclosure.
Figure 14:
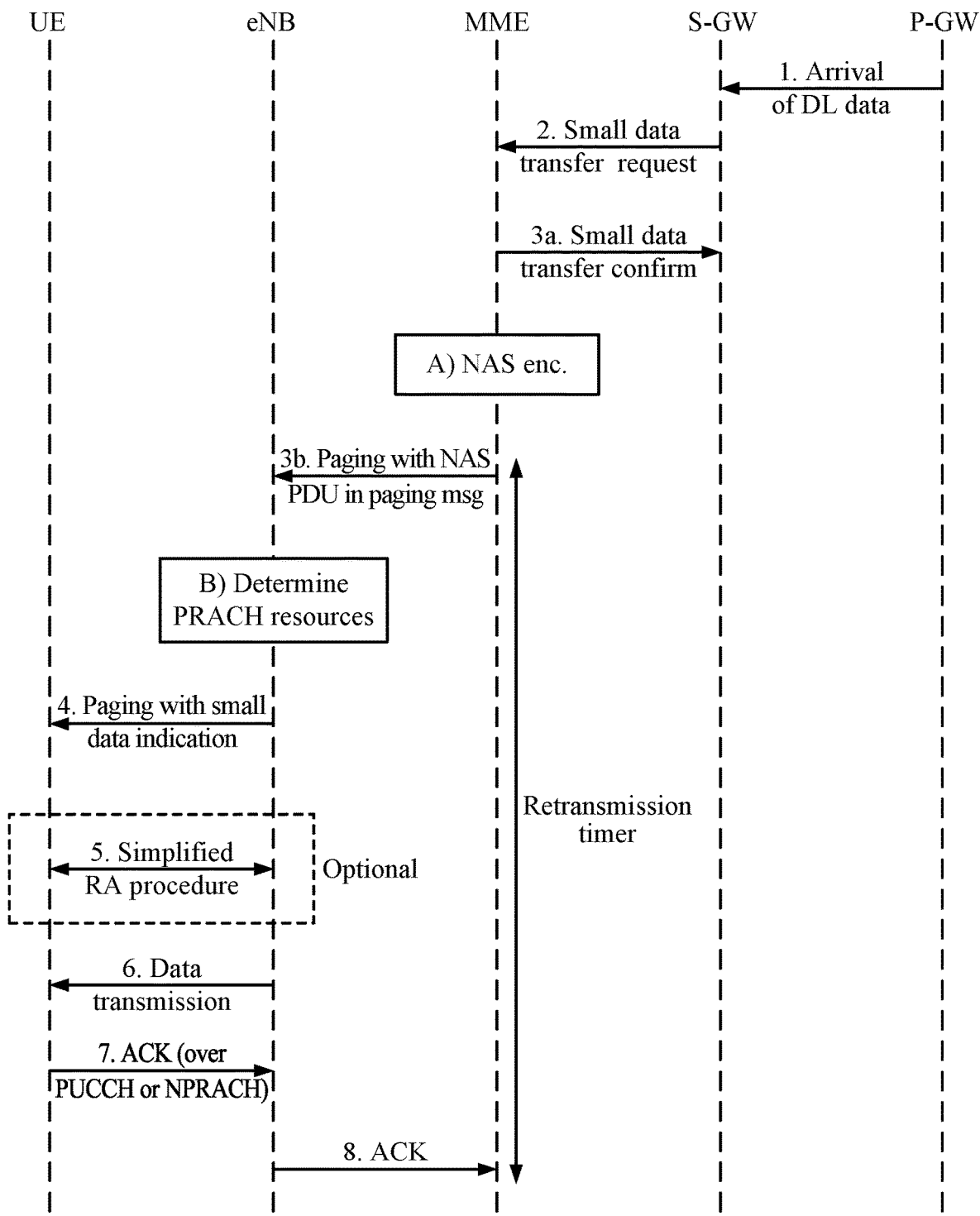
Figure 15:
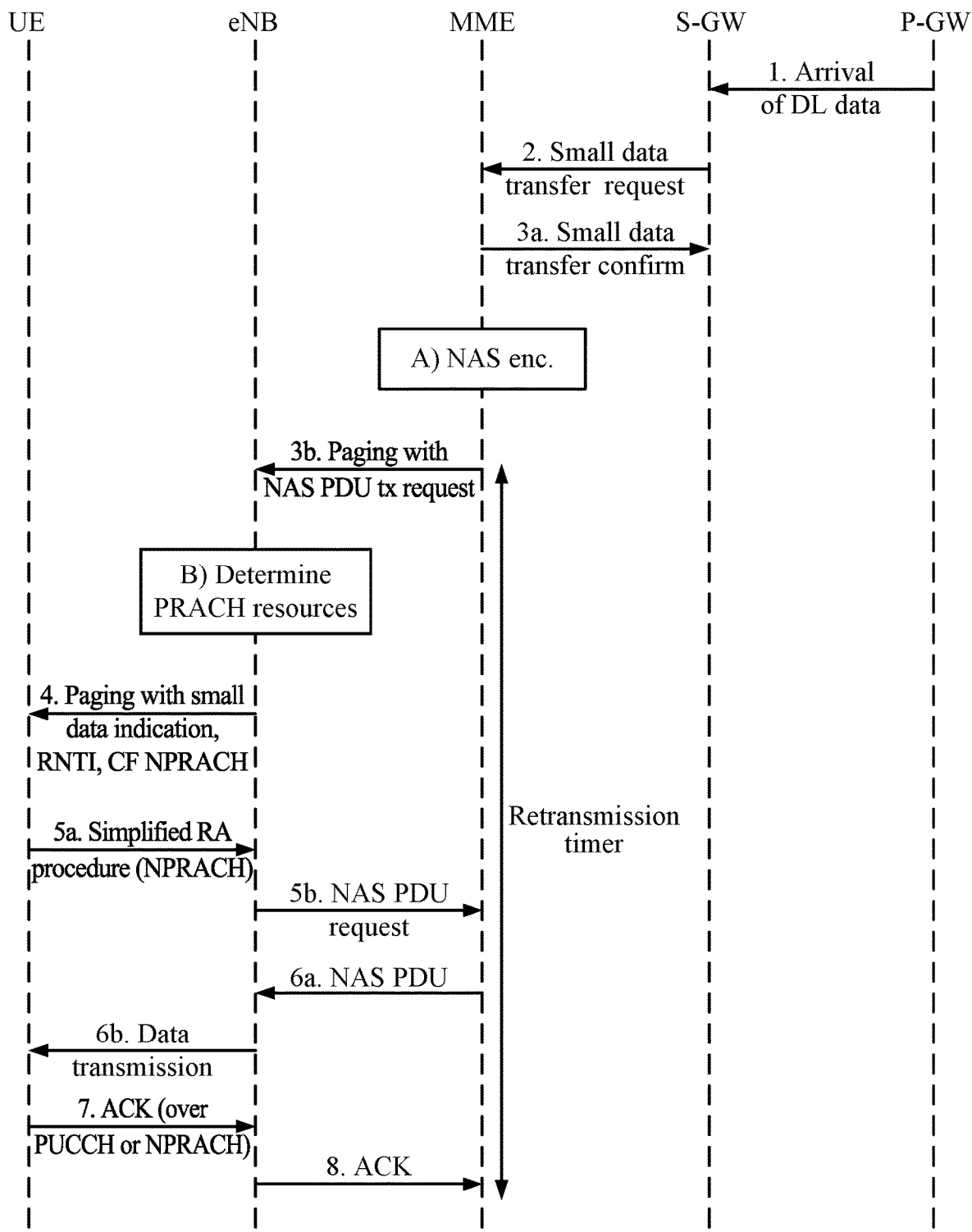

FIGS. 13-15 are example call flow diagrams illustrating different options for delivering a small amount of MT data following a paging message, in accordance with certain aspects of the present disclosure.

As illustrated in FIG. 13, most of the call flow may be similar to that described with reference to FIG. 11 but, rather than send the data in a paging message, at step 4, the paging message may simply have an indication of a small amount of data to follow.

There are different ways to enable this. For example, in some cases, the eNB may transmit information regarding the data transmission in the paging message (e.g. an RNTI to use for monitoring PDCCH-PDSCH containing the NAS PDU). This approach may have a reduced overhead, but if the UE does not receive the paging, the resources may be wasted and the UE may not have timing advance information. In any case, the UE may monitor the for PDCCH scrambled with a given RNTI, the corresponding PDSCH may contain the NAS PDU.

In some cases, if the UE does not decode the PDSCH with NAS, it can keep monitoring PDCCH for some time for retransmissions. If the UE receives PDSCH with NAS, it can send PRACH (as an ACK) and go back to sleep. This same idea can be applied to multiple NAS PDUs (e.g. monitor RNTI+timer).

As illustrated in FIG. 14, in some cases, the UE may perform a relatively simplified RA procedure, at step (5), after receiving the page indicating the small data to follow. The UE may then, after receiving the data transmission at step (6), send an ACK (e.g., via a PUCCH or NPRACH), at step (7), which the eNB forwards to the MME, at step (8).

As illustrated in FIG. 15, in some cases, the eNB may include an indication of an NPRACH resource for contention-free access in the paging message, and UE transmits NPRACH. In this case, the NPRACH may provide confirmation that the UE is in the cell and, so, may reduce overhead (e.g., the data may not be sent if no NPRACH is received by the base station), however the NPRACH does take reserved resources. In any case, upon detection of NPRACH, the eNB can include the data in MSG2, at step 6b. In some cases, the MSG2 may use a different RNTI (instead of RA-RNTI) to avoid excessive power consumption to other UEs (RNTI can be included in paging message). The MSG2 may be scheduled, for example, by (N/M)PDCCH. MSG2 may also include power control/TA information and may be ACK'd, for example, by a PUCCH (since, in this case, the UE may have TA and power control information).

FIGS. 16 and 17 illustrate example code for formation of a paging message and downlink data message, in accordance with certain aspects of the present disclosure. As with FIG. 12, the variable names and values shown are for illustrative purposes only and actual names and values may vary.

To transmit MO data, current UEs may need to wait until msg5 to transmit data (in NAS PDU). In other words, current techniques may require the UE to establish an RRC connection first just to send a very small amount of data. Aspects of the present disclosure, however, provide for connectionless transmission of MO data (over NAS) in earlier messages (e.g. message 1 or message 3).

Figure 18:
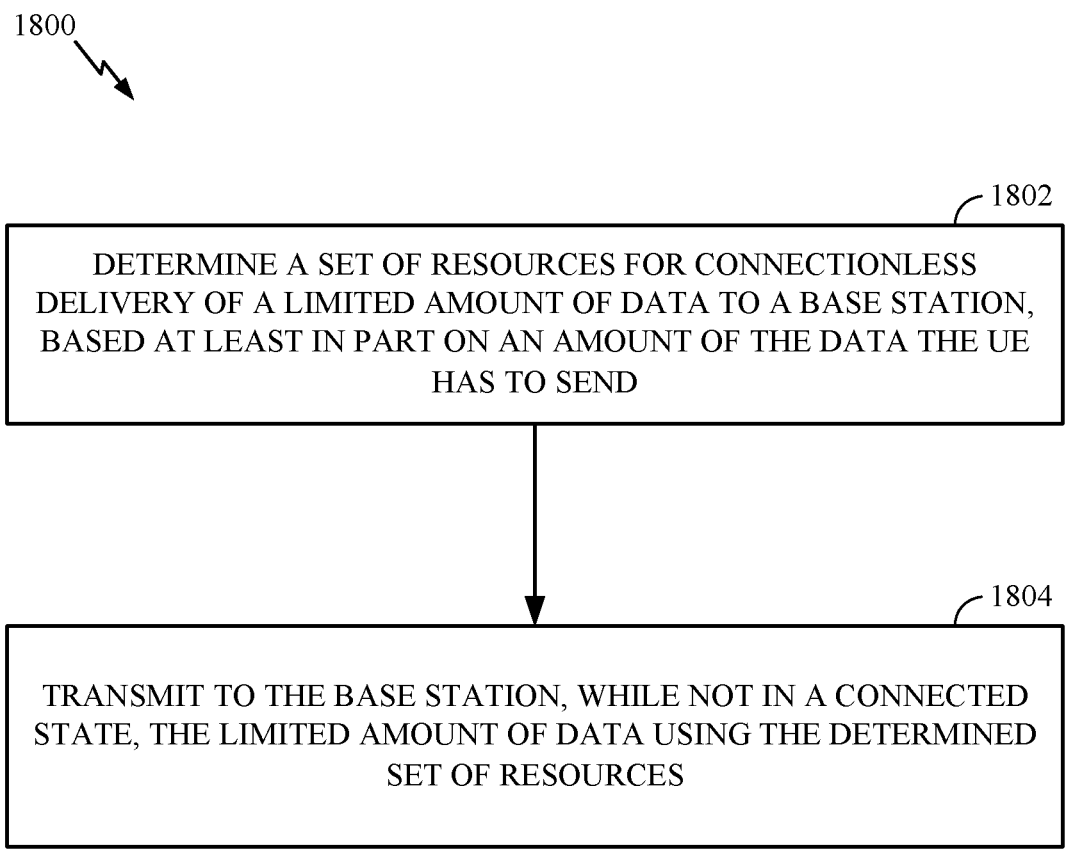
FIG. 18 illustrates example operations that may be performed by a user equipment to help optimize delivery of small amount of mobile originated (MO) data, in accordance with certain aspects of the present disclosure.

FIG. 18 illustrates example operations 1800 that may be performed by a user equipment to help optimize delivery of small amount of mobile originated (MO) data, in accordance with certain aspects of the present disclosure.

Operations 1800 begin, at 1802, by determining a set of resources for connectionless delivery of a limited amount of data to a base station, based at least in part on an amount of the date the UE has to send. At 1804, the UE transmits to the base station, while not in a connected state, the limited amount of data using the determined set of resources.

Figure 19:
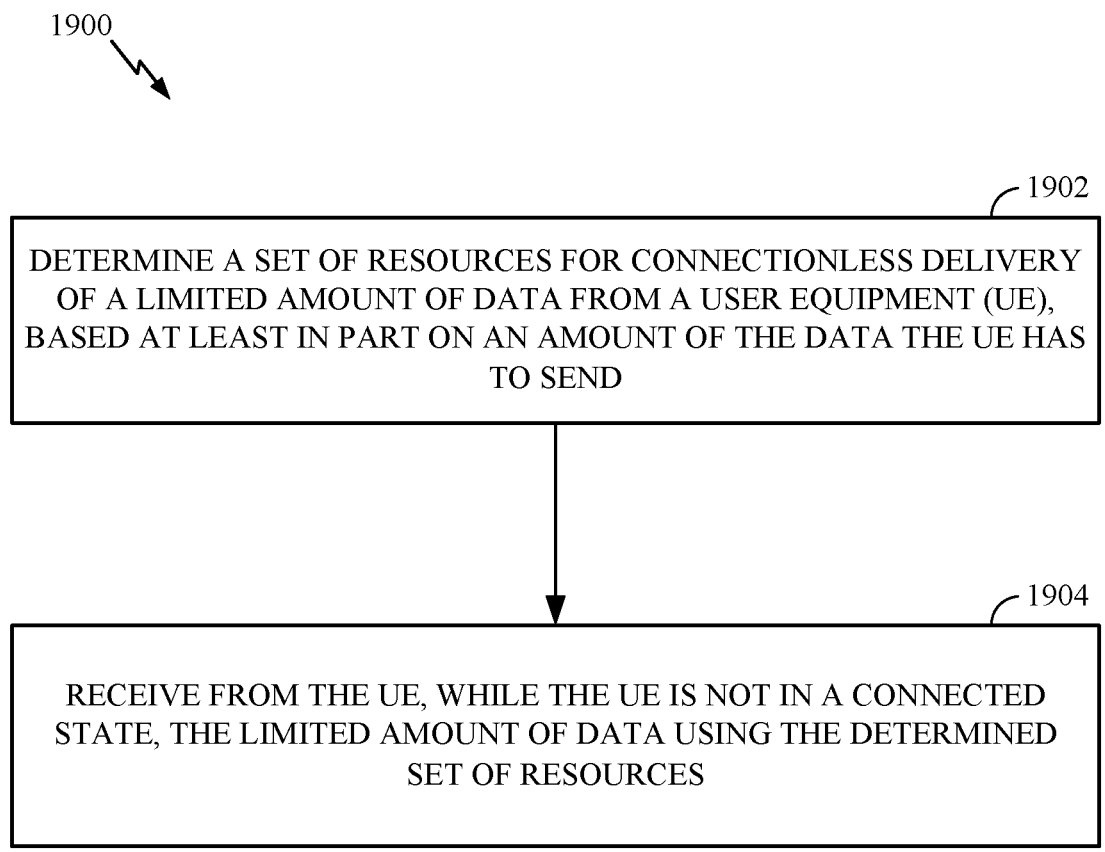
FIG. 19 illustrates example operations that may be performed by a base station to help optimize delivery of small amount of MO data, in accordance with certain aspects of the present disclosure.

FIG. 19 illustrates example operations 1900 that may be performed by a base station to help optimize delivery of small amount of MO data, in accordance with certain aspects of the present disclosure. For example, operations 1900 may be performed by a base station to receive a small amount of MO data delivered by a UE performing operations 1800.

Operations 1900 begin, at 1902, by determining a set of resources for connectionless delivery of a limited amount of data from a user equipment (UE) based at least in part on an amount of the date the UE has to send. At 1904, the base station receives from the UE, while the UE is not in a connected state, the limited amount of data using the determined set of resources.

For transmission in message 1, the UE may not have uplink timing, so a new waveform or new procedures may be used. In some cases, a new waveform may be used that is amenable to (1) Contention based and (2) Unsynchronized transmission. In some cases, an (N)PUSCH may be used, but the UE may need to remember the TA from the last connection, such that it remains orthogonal to other users.

In some cases, the eNB may reserve a set of resources for the MO data transfer. If msg1 is to be used, the set of resources reserved may be different for different coverage levels and/or packet sizes. If MSG3 is to be used, MSG1 resources may be partitioned according to different CE levels and/or coverage levels and/or packet sizes. In MSG2 (random access response), the eNB may include the uplink grant, while MSG3 may contain the data transmission, which may be encapsulated in a NAS PDU. Acknowledgement or contention resolution may be transmitted in a control channel or data channel (e.g. using RA-RNTI) and may include the UE identifier (UE_ID) of UE that made it through.

Figure 20:
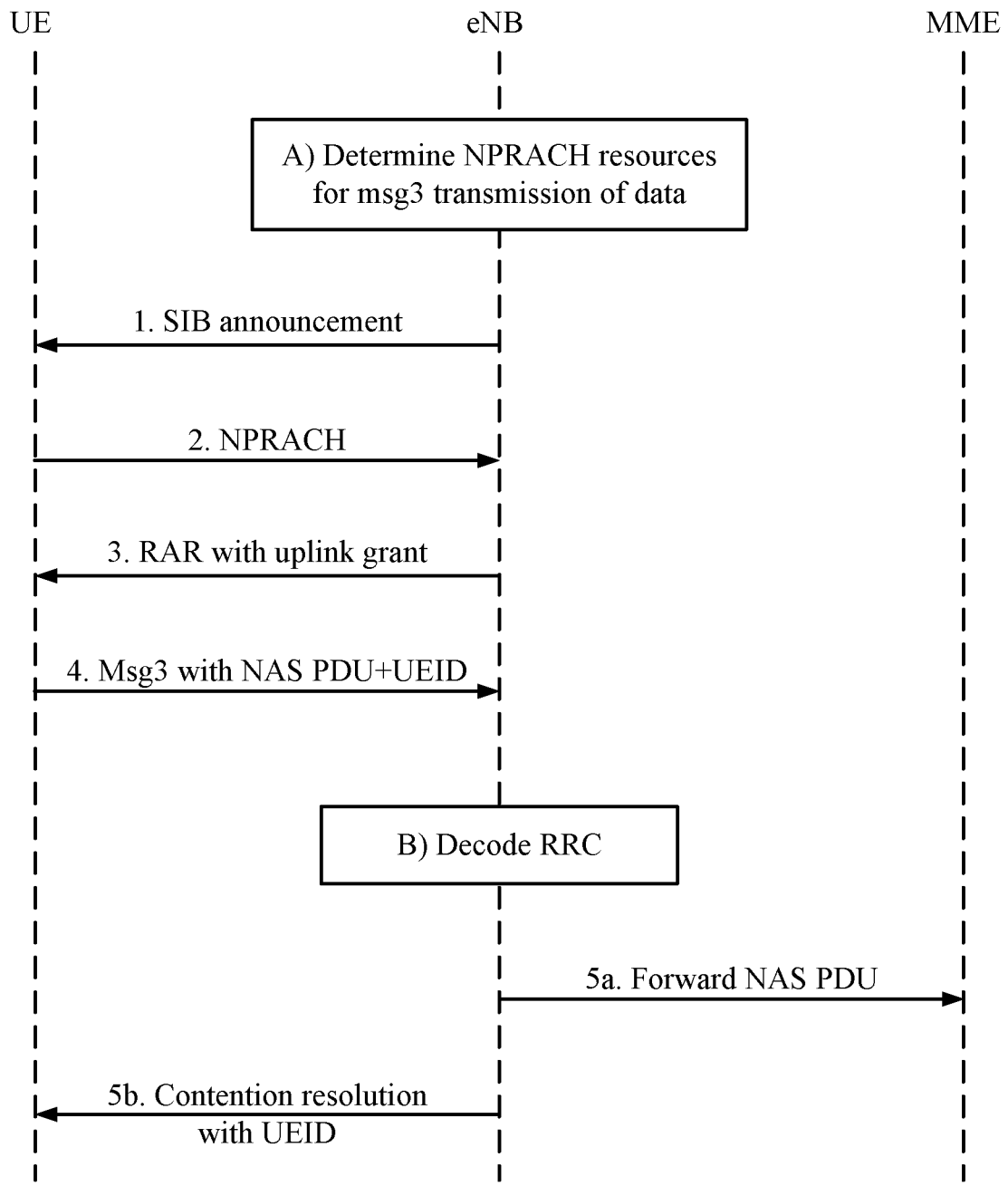
FIG. 20 is an example call flow diagram for delivering a small amount of MO data, in accordance with certain aspects of the present disclosure.

FIG. 20 illustrates an example call flow diagram for optimized MO data delivery in msg3. At step A), for resource allocation, the eNB decides, for example, to allow transmission of 10 bytes and 20 bytes without RRC connection. It may, thus, give NPRACH resources for each size (and may be also for different CE levels). At step 1), the eNB announces the resources (e.g., via SI). At step 2), the UE selects the resources based on the announcement and the amount of data to transmit, and transmits NPRACH. At step 3), the UE receives RAR which may include the uplink grant, power control and TA for MSG3. At step 4), the UE then transmits MSG3 with UEID+NAS PDU. At step B), the eNB decodes the RRC message. At step 5a), the eNB forwards the NAS PDU to the MME. At 5b, the eNB sends the contention resolution (e.g. MPDCCH/PDCCH/NPDCCH or PDSCH with UEID) as an acknowledgement. If the UE does not receive the contention resolution (ACK), it can retransmit the data again by restarting the procedure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a first interface configured to output for transmission system information indicating different sets of resources allocated to different coverage levels;
at least one processor configured to determine a set of resources from the different sets of resources based at least in part on an amount of mobile originated (MO) data a user equipment (UE) has to send; and
a second interface configured to obtain a physical random access channel (PRACH) transmitted by the UE based on the set of resources, wherein:
the first interface is further configured to output for transmission a random access response (RAR) message after the PRACH was obtained, and
the second interface is further configured to:
obtain, after the RAR message was output for transmission and independent of a radio resource control (RRC) connection with the UE, a non-access stratum protocol data unit (NAS PDU) from the UE, wherein the NAS PDU includes the amount of MO data encapsulated as the NAS PDU.

2. The apparatus of claim 1, wherein the RAR message includes at least one of an uplink grant, a power control command, or a timing advance (TA) to be used by the UE for transmitting the amount of MO data.

3. The apparatus of claim 1, wherein the NAS PDU comprises a request including a UE identifier.

4. The apparatus of claim 3, wherein the first interface is further configured to output for transmission a contention resolution message containing the UE identifier as an acknowledgement of receipt of the amount of MO data.

5. The apparatus of claim 1, wherein the second interface is further configured to obtain the PRACH independent of the UE being in a connected state.

6. The apparatus of claim 1, further comprising:
at least one transceiver configured to:
transmit the system information;
transmit the RAR message;
receive the PRACH; and
receive the NAS PDU; and
wherein the apparatus is configured as a network entity.

7. An apparatus for wireless communication, comprising:
means for transmitting system information indicating different sets of resources allocated to different coverage levels;
means for determining a set of resources from the different sets of resources based at least in part on an amount of mobile originated (MO) data a user equipment (UE) has to send;
means for receiving, from the UE, a physical random access channel (PRACH) based on the set of resources;
means for transmitting a random access response (RAR) message after reception of the PRACH; and
means for receiving, after the RAR message was transmitted and independent of a radio resource control (RRC) connection with the UE, a non-access stratum protocol data unit (NAS PDU) from the UE, wherein the NAS PDU includes the amount of MO data encapsulated as the NAS PDU.

8. The apparatus of claim 7, wherein the RAR message includes at least one of an uplink grant, a power control command, or a timing advance (TA) to be used by the UE for transmitting the amount of MO data.

9. The apparatus of claim 7, wherein the NAS PDU comprises a request including a UE identifier.

10. The apparatus of claim 9, further comprising means for transmitting a contention resolution message containing the UE identifier as an acknowledgement of receipt of the amount of MO data.

11. The apparatus of claim 7, wherein the means for receiving the PRACH comprises means for receiving the PRACH independent of the UE being in a connected state.

12. A method for wireless communication, comprising:
transmitting system information indicating different sets of resources allocated to different coverage levels;
determining a set of resources from the different sets of resources based at least in part on an amount of mobile originated (MO) data a user equipment (UE) has to send;
receiving, from the UE, a physical random access channel (PRACH) based on the set of resources;
transmitting a random access response (RAR) message after receiving the PRACH; and
receiving, after transmitting the RAR message and without establishing a radio resource control (RRC) connection with the UE, a non-access stratum protocol data unit (NAS PDU) from the UE, wherein the NAS PDU includes the amount of MO data encapsulated as the NAS PDU.

13. The method of claim 12, wherein the RAR message includes at least one of an uplink grant, a power control command, or a timing advance (TA) to be used by the UE for transmitting the amount of MO data.

14. The method of claim 12, wherein the NAS PDU comprises a request including a UE identifier.

15. The method of claim 14, wherein the method further comprises transmitting a contention resolution message containing the UE identifier as an acknowledgement of receipt of the amount of MO data.

16. The method of claim 12, wherein receiving the PRACH comprises receiving the PRACH while the UE is not in a connected state.

\* \* \* \* \*